United States Patent [19]

Scott

[11] Patent Number: 4,717,476

[45] Date of Patent: Jan. 5, 1988

[54] WATER PURIFICATION APPARATUS

[76] Inventor: Colonel W. Scott, 133 Lake Front Dr., Apt. #3801, Daphne, Ala. 36526

[21] Appl. No.: 855,734

[22] Filed: Apr. 25, 1986

[51] Int. Cl.$^4$ .............................................. B01D 35/24
[52] U.S. Cl. .................................... 210/266; 210/353
[58] Field of Search ............... 210/266, 269, 284, 353, 210/355, 501, 502.1, 506

[56] References Cited

U.S. PATENT DOCUMENTS

| | | | |
|---|---|---|---|
| 3,184,064 | 5/1965 | Sampson et al. | 210/136 |
| 3,585,130 | 6/1971 | Gregory | 210/266 |
| 4,045,553 | 8/1977 | Mitsumori et al. | 210/502.1 |
| 4,152,262 | 5/1979 | Rose | 210/136 |
| 4,196,081 | 4/1980 | Pavia | 210/284 |
| 4,528,097 | 7/1985 | Ward | 210/353 |
| 4,540,489 | 9/1985 | Barnard | 210/287 |

*Primary Examiner*—Ivars Cintins
*Attorney, Agent, or Firm*—Robert F. Ziems

[57] ABSTRACT

A water purification apparatus for household use in treating municipally supplied water for removal of solid and chemical contaminants in which serially connected first, second and third water purification stage units are contained in a compact cabinet enclosure. The first and third stage units function as aerating and filtering units as well as to control flow through the second stage unit in which a column of granular activated carbon is contained with a small percentage of silver to inhibit growth of bacteria in the granular activated carbon. Each of the first and third units includes an interior chamber spaced by restricted aperture plates and contain between 3 and 5 multifaceted silicon beads which function as scrubbers to remove filtered particles from filter pad units on opposite ends of each of the first and third units.

4 Claims, 7 Drawing Figures

WATER PURIFICATION APPARATUS

BACKGROUND OF THE INVENTION

This invention relates to water purification and, more particularly, it concerns apparatus for removing chemicals, solids and other contaminates from municipally treated water to provide purified water having the characteristics of high quality "bottled water", as needed, from a conventional pressurized municipal water supply.

The need for improving the quality of water supplied to households by municipalities is well known and made evident by dramatic recently increased demand for bottled water and/or a variety of commerically available purification devices designed for attachment to household water taps, all for the purpose of obtaining palatable drinking water. Although commercially available bottled water represents an acceptable alternative to tap water supplied from municipal treatment centers from the standpoint of avoiding the objectionable and possibly harmful effects of drinking or otherwise consuming the municipally supplied tap water, it obviously is not only very expensive, but space consuming and otherwise cumbersome in its use. These characteristics of bottled water have made it competitive with a wide variety of soft drinks now commonly substituted for drinking water needs.

Contaminants in municipally supplied tap water which detract from its desirability and possibly its fitness for consumption by people include a combination of particulate solid materials such as sand, chips of various metal oxides and the like and of chemicals, principally chlorine or other chemicals used in the municipal purification process but including as well such chemicals as lead, mercury, iron and nitrates usually associated with "hard" water. The removal of the solid contaminates, in itself, can be effected by filtration without exessive difficulty. While filter clogging will result ultimately, its presence is readily discernible as a result of reduced water flow or pressure at the outlet of the filter and thus cleaning or changing of the solids contaminate removing filter units is a possibility. Chemical contaminates in tap water may be removed by passing the water through a bed of granular activated carbon. Additionally, it is known that when granular active carbon is impregnated with a small percentage of metallic silver, the growth of bacteria in the activated carbon may be inhibited for as long as the activated carbon is effective to adsorb or absorb the chemical contaminants. On the other hand, the granules of activated carbon can in themselves contribute to the solid contaminates in the water unless care is taken to restrict passage of carbon particles to the water to be consumed.

Commercially available filtering or other water purification appliances designed for easy installation to a municipally supplied water tap, though quite popular, fall short of an adequate solution to purification of tap water either as a result of inability to remove all contaminants from the water or as a result of diminishing in effectiveness after a relatively short period of use. U.S. Pat. Nos. 3,184,064—Sampson et al. and 4,540,489—Barnard exemplify such appliances in the sense that they disclose compact assemblies of multiple filter stages in which one stage includes activated carbon to remove chemical contaminants from municipal water. The other filter stages remove varying sizes of particulate solid contaminants. While the disclosures of these patents as well as other similar appliances available commercially are believed to be effective for their intended purpose, both disclosures rely on access to the filter stage components for cleaning or reconditioning rather than on design criteria intended to supply purified water for extended periods of time, such as several years, without need for servicing or maintenance. The need for regular servicing detracts not only from the use of such appliances but also results ultimately in use under conditions where the appliance is no longer effective to provide water of the same quality and under the same flow rates which occurred when it was initially placed in service. There is a need, therefore, for a household water purification appliance, which like the aforementioned patent disclosures, is compact and easily installed but which is capable of providing for human consumption, the equivalent of high quality bottled water and which is effective to that end for several years of operation without maintenance.

SUMMARY OF THE INVENTION

In accordance with the present invention, a compact cabinet enclosed water purification unit which is capable of positioning on a conventional kitchen countertop, is provided with separately contained, serially connected first, second and third water purification stages of a construction to optimize respective prefiltering, chemical adsorption and/or absorption and final filtering functions during effective operation in a household water system for periods as long as five years without maintenance. The construction is based in part on restrictive flow through the first and third stages to develop highly turbulent flow of water during the filtering operations provided by these stages as well as to effect a self-cleaning or scrubbing of these filter stages during use. The second stage is characterized as a bed of loosely contained granular activated carbon containing a small percentage of silver to inhibit growth of bacteria in the activated carbon bed. Loose containment of the granular carbon coupled with a reduction in the flow rate of water through the bed insures complete removal of chemical contaminants and maximizes the life of the bed.

In a preferred embodiment, each of the purification stages is in the form of a sealed vertically oriented cylindrical enclosure, the three enclosures being connected in a manner so that water flow is vertical and upward through each stage. The cylindrical containers of the first and third filter stages are small relative to the container of the central silver impregnated granular activated carbon or bacteriostatic filter stage and both the first and third stages have restricted inlets and outlets to insure a high velocity turbulent flow of water therethrough. Each of the first and third stages, moreover, contains an adequate number of multifaceted silicon beads, preferably four or five, which act as scrubbers for filter screens at opposite ends of the first and third filter stages. The second or granular activated carbon stage, as indicated, is loosely packed to assure movement of the individual carbon granules during water flow through this stage and is additionally provided with filter screen means at opposite ends to ensure containment of the granular activated carbon within the enclosure of the second stage.

A principal object of the present invention is, therefore, the provision of a compact water purification apparatus for use in households to convert municipally supplied water to water having the characteristics of high quality bottled water and to provide such a purification apparatus which may be placed in service and used in a conventional household to supply such purified water for periods of time as long as 5 years without servicing. Other objects and further scope of applicability of the present invention will become apparent from the detailed disclosure to follow taken in conjunction with the accompanying drawings in which like parts are designated by like reference numerals.

DETAILED DESCRIPTION OF THE PREFERRED EMBODIMENT

Figure 1:
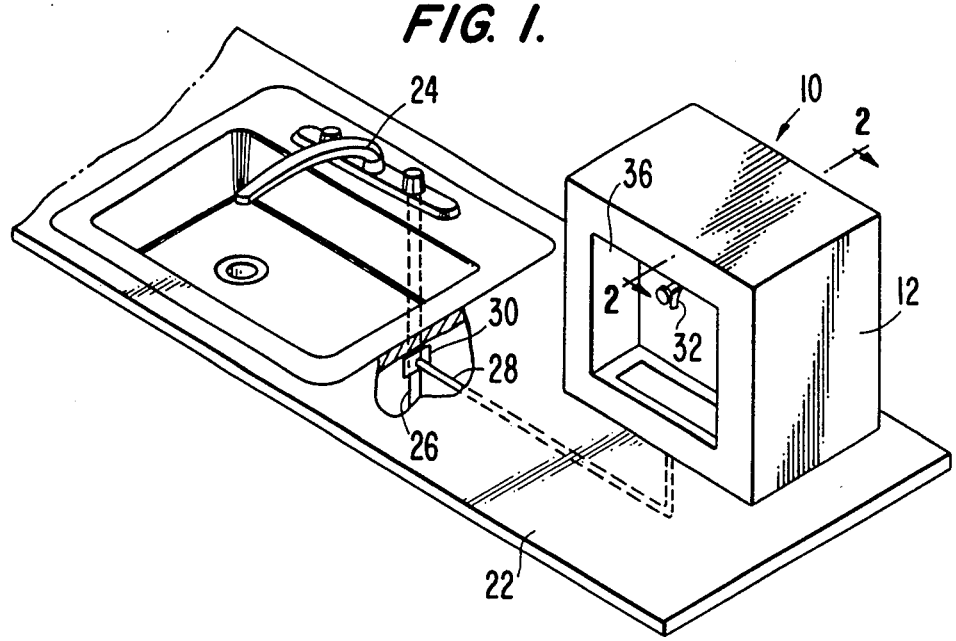
FIG. 1 is a fragmentary perspective view illustrating the installation of the water purification apparatus of the present invention.
Figure 2:
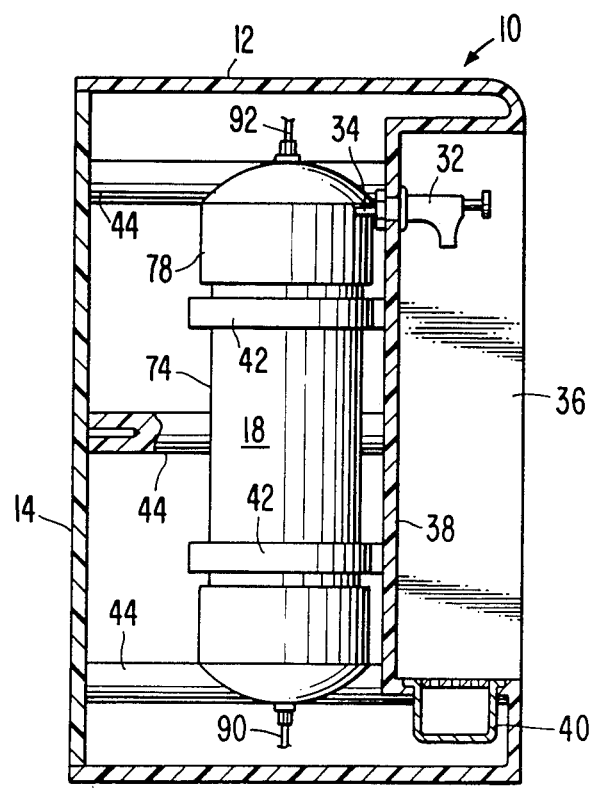
FIG. 2 is an enlarged cross section taken generally on line 2—2 of FIG. 1.
Figure 3:
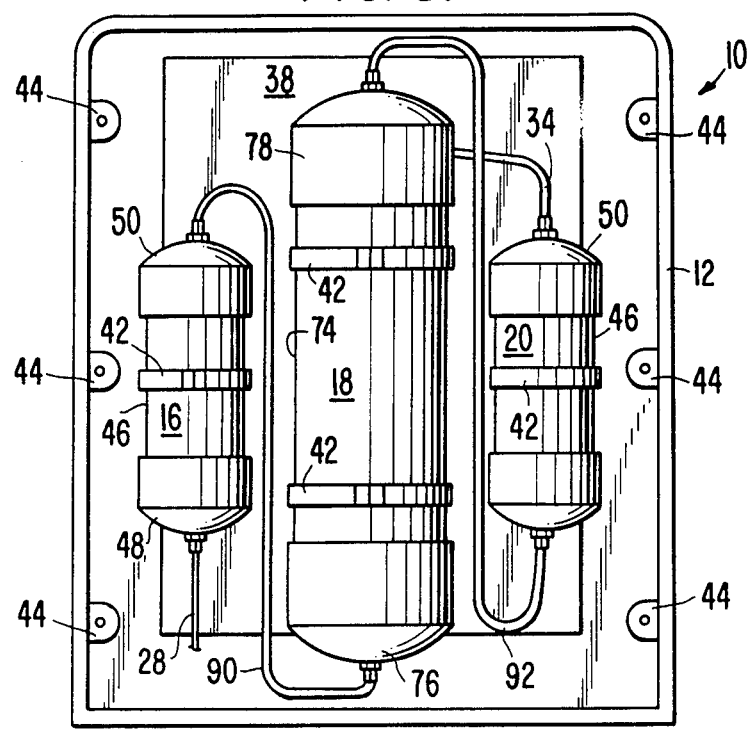
FIG. 3 is a rear elevation of the cabinet illustrated in FIGS. 1 and 2 with the back panel removed.

In FIGS. 1–3, a preferred embodiment of the water purification apparatus of the present invention is generally designated by the reference numeral 10 and shown to include an exterior cabinet-like enclosure 12 having a back panel 14 for containing first, second and third stage water purification units 16, 18 and 20, respectively. In the illustrated embodiment, the cabinet 12 is intended to be mounted on the top of a conventional kitchen sink counter 22 adjacent to or otherwise in the region of a faucet or tap 24 to which municipal water is supplied through a plumbing line 26. The exterior dimensions of the cabinet are approximately 12 inches in width, 9 inches in depth and 14 inches in height to accommodate the illustrated countertop installation. A unit inlet conduit 28 may be coupled with the municipal water supply line 26 using a conventional saddle valve assembly 30 for the discharge of purified water, on demand, through a tap 32 connected to an outlet conduit 34 of the apparatus 10. It is contemplated, however, and will be apparent from the description of the functioning components of the apparatus 10 that other types of installation might be employed. For example, the cabinet 10 could be simplified and reduced somewhat in size for storage in the space beneath the counter 22 with the outlet conduit 34 connected to a faucet or tap mounted adjacent to the faucet 24.

The physical construction of the cabinet 12 may be appreciated particularly to FIGS. 2 and 3 of the drawings in which the front, side, top and bottom walls are defined by a unitary molding of appropriate plastic material such as polyvinyl chloride (PVC). The front wall is formed with a rectangular recess 36 having a rear wall portion 38 and being of a depth to accommodate the tap 32. Also, a drip tray 40 is positioned in the bottom wall of the recess 36 under the outlet tap 32 and may either be removable from the cabinet 12 for periodic emptying or may be equipped with a drain (not shown) as desired. Stage unit mounting straps 42 are secured preferably by solvent welding to the rear surface of the recess rear wall 38 to facilitate mounting the units 16, 18 and 20 in place within the cabinet 12. Also, the side walls of the molded cabinet 12 may be formed with interior bosses or ribs 44 for stiffening and to facilitate removable securement of the back panel 14 by screw bolts (not shown).

The structural design of the cabinet 12 in the illustrated embodiment, though preferred, may vary from that shown and described without sacrifice of its intended purpose to retain and enclose the purification stage units 16, 18 and 20 now to be described. The first and third stage units 16 and 20 are of substantially identical construction except for filter sieve size employed in each and parts of the units 16 and 20 which are interchangeable are designated by the same reference numerals in FIGS. 3–5 of the drawings.

Figure 4:
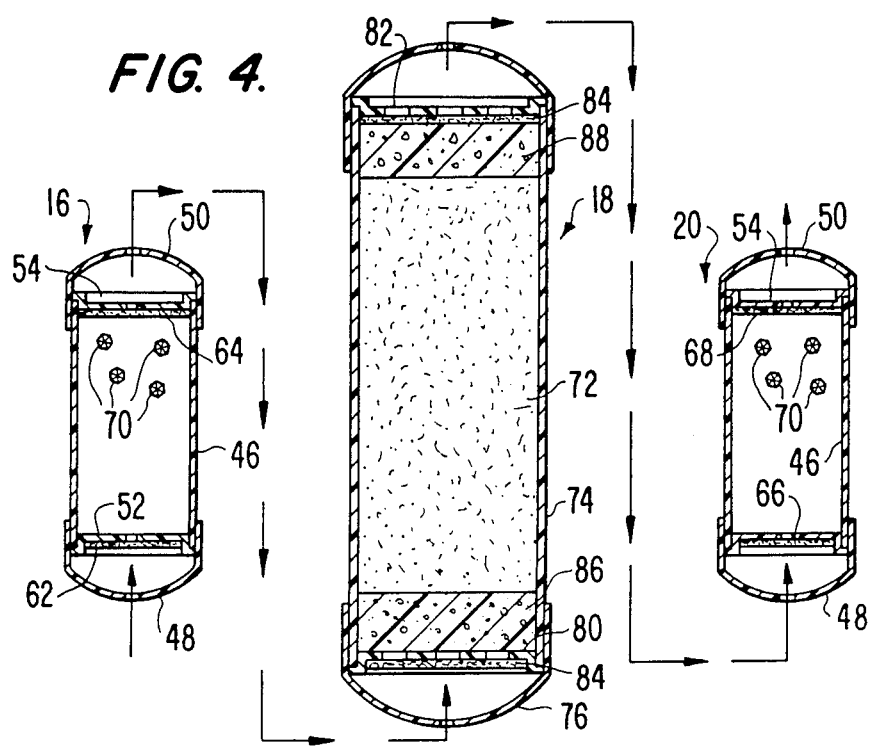
FIG. 4 is a composite schematic view illustrating the cross sectional structure of each of the purification stages.
Figure 5:
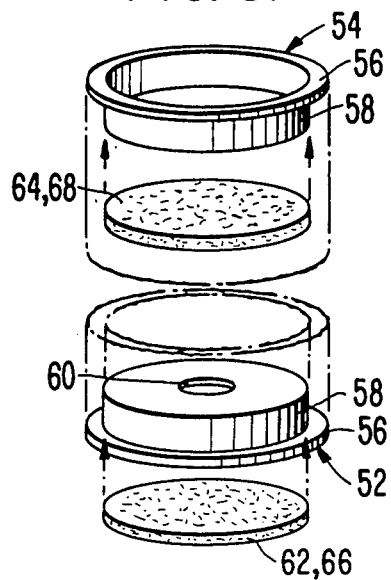
FIG. 5 is an exploded perspective view illustrating, on an enlarged scale, end components of the first and third filter stages.
Figure 6:
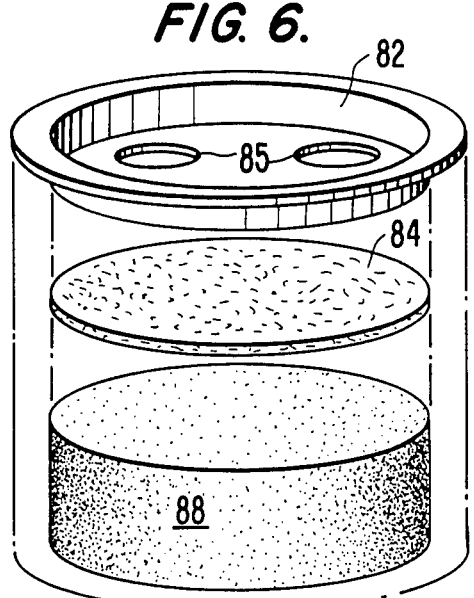
FIG. 6 is a similar exploded perspective view illustrating components incorporated in the second purification stage.

As shown in FIGS. 3 and 4, each of the units 16 and 20 includes an outer sealed housing defined by a cylindrical body 46 closed at opposite ends by inlet and outlet caps 48 and 50 respectively. Preferably, the cylindrical body portions 46 are formed of 2 inch ID PVC tubing of a length approximating 4 inches. The caps 48 and 50 are formed of a similar material to facilitate sealing by solvent welding in a manner well known in the handling of plastic plumbing fixtures. An apertured, filter screen supporting PVC plate 52 is nested in and secured by solvent welding at the bottom of each of the units 16 and 20 whereas a similar plate 54 is secured in the top end of the body 46 in each of the units 16 and 20. As may be seen in FIG. 5, the apertured plates 52 and 54 are hat-shaped to define a peripheral flange 56 engageable with the end of each of the tubular bodies 46 and a cylindrical portion 58 of reduced diameter to fit snugly within the tubular bodies 46. Each of the plates 52 and 54 is formed with a single opening 60 approximately ⅜ inches in diameter to effect a restricted flow orifice at the inlet and outlet ends of each of the stage units 16 and 20. The plates 52 and 54 further support filter screens of varying sieve size to be described.

The physical configuration of the filter screens supported by the apertured plates 52 and 54 are essentially the same and are constituted by a fiberous network of polypropylene, approximately ⅛ inch in thickness and which are available commercially from Fiber-Taxis, Inc. of New Jersey. Such screens may be secured by solvent welding directly against the plates 52 and 54, it being important only that care be taken to avoid placement of solvent on the area of the screens which overlie the apertures 60. The screen 62 secured to the plate 52 at the inlet end of the first stage unit 16 is of a sieve size to prevent passage of solid particles on the order of 10 microns and larger. The screen 64 at the outlet end of the first stage unit 16 on the other hand is designed to prevent passage of such particles which are larger than 5 microns in diameter. The filter screens 66 and 68 in the third stage unit 20 differ from those of the first unit 16 only in that they are of smaller sieve size. Specifically, the screen 66 is at the inlet of the third stage 20 is a 5 micron screen whereas the screen 68 at the outlet end of the third unit 20 is a 1 micron screen and thus will ensure that solid particles larger than 1 microns will not pass to the outlet conduit 34.

Figure 7:
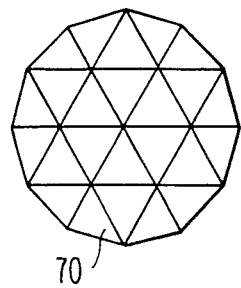
FIG. 7 is a side elevation illustrating in general the configuration of scrubbers used in the first and third filter stages.

The restricted opening 60 in the deflector plates 52 and 54 of both the first and third stage units 16 and 20 results in a highly turbulent flow of water within the bodies 46 of the units. The turbulent flow of water through each of the units 16 and 20 brings about a motion of scrubbers contained between the filter screens of each of these units. In particular, and on assembly of the units 16 and 20 a plurality, preferably 4 in number, of multifaceted silicon beads 70, each approximately ¼ inch in diameter, is placed in the body 46 before closure by one of the end plates 52, 54. These beads are sold commercially by arts and crafts shops to hobbyists and are geodesic in exterior conformation to provide the multifaceted appearance illustrated in FIG. 7.

It has been found by experimentation that when the units 16 and 20, including the apertures 60, are dimensioned as described, the use of four scrubber beads 70 optimizes the intended scrubbing action. More than 5 such beads tend to reduce flow rate through the units 16 and 20 whereas less than 3 scrubber beads 70 does not develop the desired filter clearing function.

The second purification stage unit 18 is a bacteriostatic water treatment unit in which the principal water treatment medium is a column 72 of granular activated carbon impregnated with a small percentage, specifically 1.05%, of silver. The column of granular activated carbon is contained in a sealed receptacle having the physical characteristics of the first and third stages 16 and 20 but of a larger size for reasons which will become apparent from the description to follow. In particular, the sealed housing of the unit 18 is formed by a cylindrical body 74 which in practice is constituted by an 8½ inch length of 3 inch ID PVC tubing. The ends of the body 74 are closed by inlet and outlet caps 76 and 78, respectively which are formed of PVC to facilitate solvent welding about the ends of the tubular body 74. Deflector plates 80 and 82 are sealed to the ends of the tubular body 74 within the respective inlet and outlet caps 76 and 78 and each carry a ⅛ inch 5 micron filter pad 84. While the deflector plates 80 and 82 are similar in configuration to the deflector plates 52 and 54 described with reference to the first and third stages 16 and 20, they are both of larger effective diameter and are formed with a plurality (3 in the illustrated embodiment) of openings 85 of a size and number to minimize obstruction to flow while at the same time providing adequate support for the filter units 84. The column of granular activated carbon 72 is separated from the deflector plates 82 and 80 by reticulated or open celled polypropylene foam pads 86 and 88. The pads 86 and 88 prevent passage of particles in excess of 100 microns and in the unit 18 serve primarily to contain the granular activated carbon particles in the column 72.

A feature of the granular activated carbon column 72 which is important to extending the effective life of the column for removal of chemical contaminants in the water under treatment is that the granular activated carbon particles are loosely contained between the reticulated foam pads 86 and 88. This is achieved by loading the volume within the body 74 and between the pads 80 and 86 to approximately 90-95% with the granular activated carbon particles. As a result, the carbon particles or grains are agitated slightly during passage of water therethrough. In this way, the total effective surface area of the individual activated carbon grains in the column 72 is used during the life of the unit 18. The small percentage of silver in the granular activated carbon, as is known, serves to inhibit any bacterial growth within the bed. In this respect, the movement of the granules in the column augments the effectiveness of the silver.

As may be appreciated by reference to FIGS. 3 and 4 of the drawings, the stage units 16, 18 and 20 are serially interconnected by conduits 90 and 92 in a manner such that the flow of water through each of the three stages is upwardly and vertical. This direction of flow through the units 16 and 20 ensures effective movement of the scrubber beads 70. Vertical flow through the granular activated carbon column 72 ensures movement of the loosely packed carbon particles.

The dimensional proportions of the units 16 and 20 relative to the bacteriostatic second stage unit 18 is also important to maximizing the effectiveness of the carbon column 72. In other words, a relatively high velocity turbulent flow through the first and third units is effected by the restricted size of the openings in the deflector plates 52 and 54 therein, whereas in the second stage unit 18, relatively slow flow rates occur to ensure full contact of the water under treatment with the particles of the carbon column 72. The combination of preliminary experimentation and calculations principally with respect to the life of the granular activated carbon column 72 in the unit 18 provide a design in the apparatus 10 capable of producing 5 and ½ gallons of purified water a day for a period as long as 5 years. Five and ½ gallons a day is more than adequate for water consumed in the average household each day and the quality of the water provided is equal to or the same as the highest quality of bottled water presently available commercially.

In light of the foregoing, it will be appreciated that as a result of the present invention, a highly effective water purification apparatus is provided and by which the stated objectives, among others, are completely fulfilled. It is contemplated and will be apparent to those skilled in the art from the preceeding description that modifications and/or changes may be made in the embodiment illustrated and described without departure from the present invention. Accordingly, it is expressly intended that the foregoing description and accompanying drawing illustrations are illustrative only, not limiting, and that the true spirit and scope of the present invention be determined by reference to the appended claims.

I claim:

1. Apparatus for removing chemicals and particulate solid materials from municipally treated water, said apparatus comprising:
    a cabinet enclosure having an inlet for connection to a pressurized supply of municipally treated water and an outlet for discharging purified drinking water to a controlled delivery tap on demand;
    a first purification stage unit in said cabinet for filtering relatively large solid particles from water passing from said inlet;
    a second purification stage unit in said cabinet for removing chemicals from water passing said first stage unit;
    a third purification stage unit in said cabinet for removing relatively small solid particles from water passing said second stage unit;
    each of said first and third stage units including means to define a relatively large chamber, a pair of filter pads spaced by said chamber and restricted inlet and outlet openings spaced by said chamber to maintain a highly turbulent flow in said chamber of said first and third stage units, respectively, upon discharge of purified water from said delivery tap, said filter pads covering said restricted inlet and outlet openings; and scrubber means in the chamber between said pair of filter pads in each of said first and third stage units for cleansing said filter pads of filtered particles.

2. The apparatus recited in claim 1, wherein said scrubber means comprises a plurality of multifaceted silicon beads in the relatively large chambers of said first and third stage units.

3. The apparatus recited in claim 2, wherein the number of said silicon beads contained in each of said first and third stage units ranges from between 3 and 5.

4. The apparatus recited in claim 3, wherein the approximate diameter of said silicon beads is ¼ inch.

* * * * *